United States Patent

Re et al.

[11] Patent Number: 5,333,571
[45] Date of Patent: Aug. 2, 1994

[54] AUTOMATIC ANIMAL FEEDING DEVICE

[76] Inventors: John Re, P.O. Box 379, Jamesport, N.Y. 11947; Robert Cuomo, P.O. Box 9, East Quogue, N.Y. 11942

[21] Appl. No.: 996,799

[22] Filed: Dec. 24, 1992

[51] Int. Cl.⁵ .................................................. A01K 5/02
[52] U.S. Cl. ................................................. 119/56.1
[58] Field of Search ............... 119/51.11, 51.12, 51.14, 119/52.1, 56.1; 222/181, 185, 424.5, 557, 129, 145

[56] References Cited

U.S. PATENT DOCUMENTS

| | | | |
|---|---|---|---|
| 1,442,382 | 1/1923 | Bullock | 119/51.11 |
| 2,585,371 | 2/1952 | Coffing | 119/51.11 X |
| 2,969,769 | 1/1961 | Paschall | 119/56.1 |
| 4,134,365 | 0/1979 | Futers, et al. | 119/51.5 |
| 4,256,054 | 3/1981 | Hitchcock | 119/56.1 X |
| 4,665,862 | 5/1987 | Pitchford, Jr. | 119/51.11 |
| 4,688,520 | 8/1987 | Parks | 119/51.11 |
| 4,722,300 | 2/1988 | Walker et al. | 119/51.11 |
| 4,733,634 | 3/1988 | Hooser | 119/51.12 |
| 4,756,277 | 7/1988 | Peng | 49/51.11 |
| 4,782,790 | 11/1988 | Batson | 119/51.11 |
| 4,829,935 | 5/1989 | Gray | 119/54 |
| 4,922,857 | 5/1990 | Arentoft | 119/51.12 |

Primary Examiner—Gene Mancene
Assistant Examiner—Thomas Price
Attorney, Agent, or Firm—Kelly & Hulme

[57] ABSTRACT

The invention relates to an automatic feeding device for animals. The device operates to provide a pre-measured amount of food at predetermined intervals. The food is automatically supplied to a feed trough by a food storage tower communicating with the trough. The tower is divided into a plurality of food containing chambers by a series of vertically spaced removable disks. As each disk is removed in an upward sequential vertical direction, the food formed by the removed disk is gravity fed into the above described trough.

3 Claims, 2 Drawing Sheets

AUTOMATIC ANIMAL FEEDING DEVICE

BACKGROUND OF THE INVENTION

1. Field of the Invention

The present invention relates to the field of automatic animal feeding devices, and more particularly to a device that delivers animal food for consumption at pre-determined intervals and in pre-measured amounts.

2. Description of the Prior Art

Automatic animal feeding devices are well known in the art. However, some of these prior art devices provide food continuously or upon demand allowing the animal to gorge itself continuously. Other devices solve this problem by employing a delivery mechanism which may be operated at timed intervals so that food is not continuously available. However, the devices of this type employ cumbersome, complicated and often noisy mechanisms which therefore are not reliable and further will scare away the animals to be feed.

Still other devices known in the art are designed for a unique type of animal or animals and therefore are not devices of general application.

Finally, it is often desirable, for diet or medical reasons, that an animal receive specific amounts of food at certain intervals. The devices of the prior art, due to their design may not be able to repeatedly deliver food in such specific pre-determined amounts.

It is therefore an object of the present invention to provide an animal feeding device which will automatically provide a specific amount of feed at pre-determined intervals.

It is another object of the present invention to provide an animal feeding device that will reliably and repeatably provide food for an animal.

It is yet another object of the present invention to provide an animal feeding device which protects the food prior to dispensing and prevents access thereto by an animal prior to the pre-determined time of feeding.

Further objects and advantages of the present invention shall become apparent for the following specifications, taken in conjunction with the attached drawings.

SUMMARY OF THE INVENTION

In accordance with the teachings of the present invention, there is herein described and illustrated an animal feeding device which includes a base member defining a feeding trough therein. The animal food is dispensed by the present invention into said feeding trough so that it may be consumed. The present invention further includes a feed storage tower disposed above said base member, said tower having an internal space therein in which animal food may be stored and further defines a bottom discharge opening communicating with the base member trough such that food may flow from said tower into the trough.

The device of the present Invention further includes a plurality of flow control disks disposed within the tower which disks are vertically spaced apart from each other and which disks form a plurality of vertically spaced chambers within said tower, each chamber containing a pre-measured amount of animal food.

Finally, the present invention includes means for sequential and at timed intervals, removing each of said disks such that the food contained in the chamber, formed above a removed disk, flows by the force of gravity, out of the tower and into the trough.

DETAILED DESCRIPTION OF THE INVENTION

Figure 2:
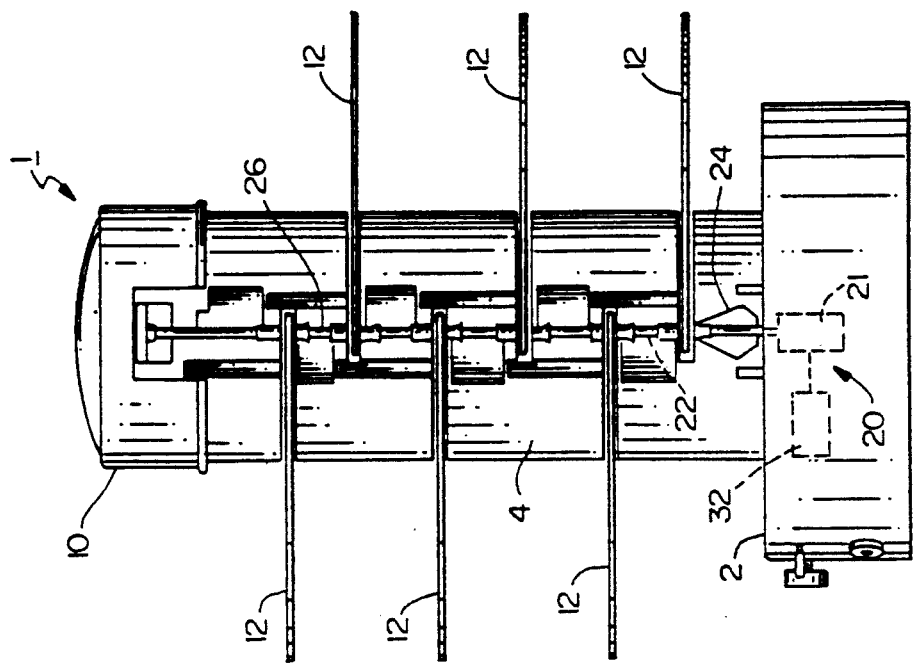
FIG. 2 is a side view of the present invention.
Figure 1:
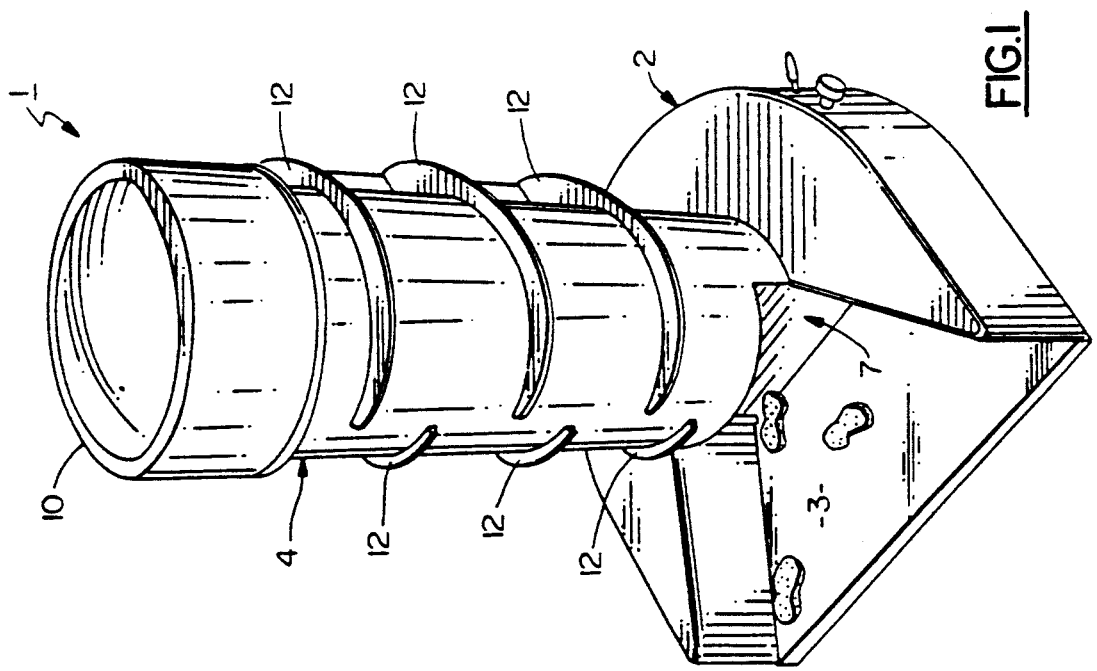
FIG. 1 is a perspective view of the present invention.
Figure 3:
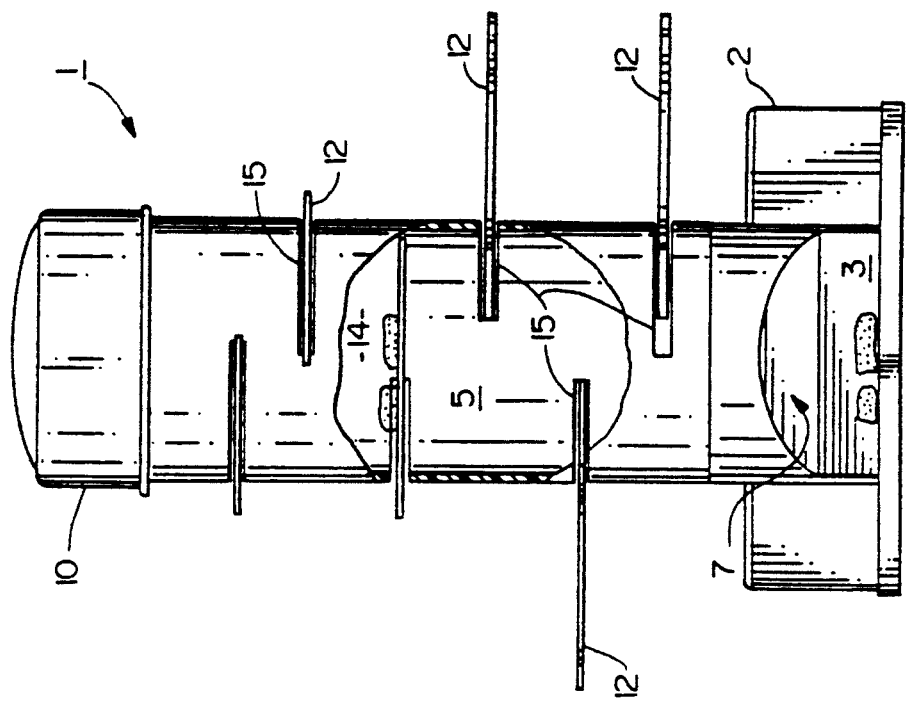
FIG. 3 is an exploded side view.

Referring now to the drawings, an animal feeding device is shown according to the present invention. This device 1 is particularly suited for pets and domestic animals but may be used with equal facility for animals in general.

With the above in mind, the device 1 has a base member 2, which defines therein a trough 3 for receiving the food provided by the present device 1 and maintaining said food available for a feeding animal. Disposed vertically above the base member 2 is a food storage tower 4, which as shown has a circular cross-section but which may be provided in any suitable shape. The tower 4 defines an internal space 5 within which animal food may be maintained and further defines a discharge opening 7 at the lower end of the tower 4 which opening communicated between the internal space 5 and trough 3 such that when food will fall through the discharge opening 7 and into the trough 3. The tower 4 further defined a food receiving opening 9 at the upper end thereof. The food to be automatically dispensed by the present device 1, is placed into the device via this food receiving opening 9.

The device 1 of the present invention is further provided with a removable lid 10 which completely covers the food receiving opening 9. The lid 10, in a preferred embodiment, is secured to present device by a friction fit of the lid 10 over the food receiving opening 9 of tower 4. However, this fit may be accomplished in any suitable manner known in the art .

The discharge of food out of tower 4 and into trough 3 is controlled by a series of chamber forming flow control disks 12 which are removably disposed within the tower 4 in a horizontal orientation relative to the surface upon which like present device 1 is place. The disks are vertically spaced apart from each other to form a series of enclosed chambers 14 within the tower 4, each of which chambers 14 may receive animal food for later dispensing and are removed from said tower through slots 15 defined in said tower 4.

The food contained in chamber 14 is discharged into said trough 3 by the sequential removal of each disk 12 starting with the disks disposed adjacent to the tower discharge opening 7 and by removing each subsequent disks in order.

When the first disk 12 is removed, the food stored in chamber 14 formed (in part) by said disk 12 falls, as a result of gravity, into the trough 3. Thereafter, after each subsequent disk is removed, in vertical order, the food contained in each of the chambers 14 formed above the removed disk falls. Since no disk 12 is removed until the one below it is first removed (other than of course the lowest disk) the food contained in chamber 14 directly above said removed disk is discharged through the tower 4 and into said trough 3.

The orderly and sequential removal of each disk 12 and the associated discharge of food contained in the chamber above and adjacent to the removed disk is accomplished, in a preferred embodiment by a drive system 20. The drive system 20 is comprised of threaded screw gear 22 which is mounted for rotation vertically along and external to said tower 4 and is driven by a motor 21 or other suitable rotation providing means. The drive system is further provided with a pyramidal shaped cam 24 mounted for travel along said screw gear such that when said gear 22 is rotated by said motor 21 in a first axial direction the cam 24 travels in an upward direction "B" along said gear 22 and when said gear 22 is operated in a second axial opposite direction the cam 24 travels in a downward direction "D" along said gear 22.

Figure 4:
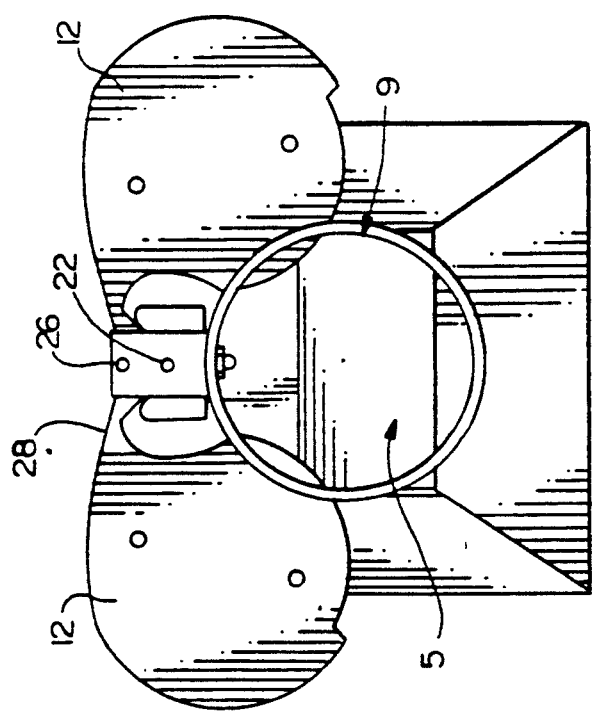
FIG. 4 is a top view of the invention.

As described above the disks 12 are removably disposed within said tower 4. This feature is accomplished by providing each disk 12 with a cam engaging arm 28 which extends externally to said tower 4 through a slot 15 provided in tower 4 when said disk 12 is disposed therewithin. The free end of the cam engaging arm 28 is rotatably mounted to an axle 26 mounted parallel to and offset from said gear 22. As can be seen in FIG. 4, the cam 24 travels along the gear 22 in the space 27 which exists between the cam engaging arm 28 and the tower 9. It is clear from a review of all the FIGURES that this space exists even when the disks 12 are completely inserted in slot 15. When the disks 12 are inserted the space 27 has a size just larger than the smallest cross-sectional dimension of the pyramidal-shaped cam 24 and when the disk 12 is fully removed from the slot 15 the size of space 27 is equal to or just larger than the largest cross-sectional dimension of cam 24. In operation, as the cam moves upward in direction "B", the small end thereof is moved into space 27 until such time as it contacts the arm 28. Thereafter, upon continued upward movement of the cam 24 along gear 22, and as a result of the increasing cross-sectional dimension of the cam 24 the cam pushes on the arm causing the disk 12 to rotate out of slot 15 on shaft 26.

As described above, as cam 24 as it moves upward on gear 24 it contacts engages said cam engaging arm 28 and causes the disk 12 to be completely rotated out from said tower such that any food contained in the chamber 14 above and adjacent to said removed disk 12 shall be gravity discharged from said chamber.

As will be apparent to one skilled in the art, the above described drive system 20 accomplishes a sequential removal of each disk 12 such that any food discharged from any chamber 14 will fall completely into said trough 3.

Finally, the device 1 of the present invention may be provided with a cover 30 to completely enclose the drive system 20 so that same may not be interferred with or otherwise cause harm to any animals or other persons using or operating the device.

When motor 21 is energized it operates the gear 22 causing the cam 24 to move upward from a first position E at the bottom of the tower 4 along gear 22 which cam 24 continues to move as long as said motor 21 is energized. As described above, as the cam 24 travels upward it engages the arm 28 of disk 12 causing the disk to rotate out of tower 4 allowing a portion of the food contained in the tower to be discharged.

The times and duration of during which the motor 21 is energized (and therefore the point at which disks are removed) is preferably controlled by a timer 32. The timer 32 is of a type and nature suitable for this application which timers are well known in the art.

In operation, initially, the motor is energized such that the cam 24 is in a position E at the bottom of said tower and the lowest disks 12 is manually rotated into the tower 4 and a predetermined amount of food charged into said tower through food receiving opening 9 and said food comes to rest on top of said inserted disk 12. This step is repeated with the remaining disks until all disks are inserted and, if desired, support a predetermined amount of animal food. The tower is then capped with lid 10.

The timer 32 may then be appropriately set such that each disk may be removed at a pre-determined time. In this way the animal or animals being feed by the device 1 of the present invention may receive food in an amount and at the time desired by the device operator.

The lid 10 of the present invention may contain measurement gradations therewithin such that the lid 10 may also be used to measure the amount of food to be contained within the tower.

Finally, the device of the present invention may be formed from any suitable material with plastic being most preferred.

The device 1 of the present invention will dispense food in a pre-determined amount at a pre-determined time, yet is rugged, reliable, relatively safe, economical to produce, and commercially practical for widespread marketing and distribution. In addition, the device 1 of the present invention requires no attention during its operation and until empty, and is relatively noiseless during operation (therefore does not startle or alarm the animals being fed).

The device is intended for use by a large variety of animals and may be modified in light of this disclosure to accommodate different animals, as such modifications may be made without departing from the basic spirit of the present invention. Accordingly, it will be appreciated by these skilled in the art that within the scope of the appended claims, the invention may be practiced other than it has been specifically described herein.

What is claimed is:

1. An automatic animal feeding apparatus for dispensing food to an animal in measured amounts at pre-determined intervals, comprising:
   a base member defining a trough therein, which trough receives said animal food and from which said food may be consumed;
   a food storage tower disposed vertically above said base member defining an internal space therein and further defining a bottom discharge opening communicating between said internal space and said food receiving trough;
   a plurality of flow control disks mounted within said tower, spaced vertically apart and forming a plurality of vertically spaced chambers within said tower, said disks being removable from said tower through slots defined therein; and
   means for sequentially removing said disks from said tower starting with the lowest disk and moving upwards such that any food contained in the chamber above and directly adjacent to the removed disk is discharged into said trough.

2. The device in accordance with claim 1 wherein said sequential disk removing means is comprised of:
   a threaded screw gear dispersed vertically along said tower for rotation;
   a pyramidal shaped cam mounted for travel along said screw gear;
   means for rotating said gear along its vertical axis such that said cam may travel in an upward or downward direction along said gear;

a cam engaging arm joined to each of said flow control disks, which arm extends out of said tower, when said disks are mounted therein, and is engaged by said cam as it travels such that said disk is removed from said tower; and an axle mounted parallel to and offset from to which said cam engaging arm is rotatably fixed.

3. The apparatus of claim 1 wherein said tower further defines a top food receiving opening to be used to fill said tower with food.

* * * * *